US008244595B2

(12) United States Patent
Giese et al.

(10) Patent No.: US 8,244,595 B2
(45) Date of Patent: Aug. 14, 2012

(54) METHOD AND SYSTEM FOR PROTECTING GAME RELATED CONTENT IN A CENTRALIZED MARKETPLACE

(75) Inventors: William Giese, Snohomish, WA (US); Christian Guirguis, Kirkland, WA (US); Chad Olsen, Bellevue, WA (US); Rory Reich, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 12/796,219

(22) Filed: Jun. 8, 2010

(65) Prior Publication Data
US 2011/0302052 A1 Dec. 8, 2011

(51) Int. Cl.
*G06Q 30/00* (2012.01)
(52) U.S. Cl. ........................................ 705/26.5; 705/51
(58) Field of Classification Search ............... 705/26.5, 705/51, 54; 463/25, 29, 1
See application file for complete search history.

(56) References Cited

U.S. PATENT DOCUMENTS

| | | | | |
|---|---|---|---|---|
| 6,119,229 | A * | 9/2000 | Martinez et al. | 726/28 |
| 7,249,139 | B2 * | 7/2007 | Chuah et al. | 1/1 |
| 8,073,778 | B2 * | 12/2011 | Williams et al. | 705/51 |
| 2001/0056383 | A1 * | 12/2001 | Shuster | 705/27 |
| 2002/0138440 | A1 * | 9/2002 | Vaidyanathan et al. | 705/54 |
| 2003/0018582 | A1 * | 1/2003 | Yaacovi | 705/51 |
| 2003/0217006 | A1 * | 11/2003 | Roever et al. | 705/50 |
| 2006/0101521 | A1 * | 5/2006 | Rabinovitch | 726/26 |
| 2007/0060315 | A1 | 3/2007 | Park | |
| 2008/0004093 | A1 | 1/2008 | Van Luchene et al. | |
| 2008/0207327 | A1 * | 8/2008 | Van Luchene et al. | 463/42 |
| 2010/0121729 | A1 * | 5/2010 | Betzler et al. | 705/26 |

OTHER PUBLICATIONS http://www.albanylawjournal.org/articles/passman_0609.pdf, Jun. 9, 2008.*
Haygood, Joe, "Check out the GFW Live In-Game Marketplace," Aeropause, [http://www.aeropause.com/2009/09/check-out-the-gfw-live-in-game-marketplace/], Sep. 18, 2009, 11 pages.
fatfoogoo—There is Money in Your Game, [http://www.fatfoogoo.com/category/fatfoogoo/], Jan. 15, 2010, 10 pages.
The Weird Pixel—Video Game News and Reviews, [http://theweirdpixel.com/], Aug. 6, 2009, 24 pages.
The Married Gamers, [http://feeds.feedburner.com/TheMarriedGamers], Mar. 19, 2010, 128 pages.
Hunter, Dan, "SonyBay," [http://terranova.blogs.com/terra_nova/2005/04/sonybay.html], Apr. 20, 2005, 47 pages.
Everquest II: The Complete Collection, Amazon.com, [http://www.amazon.com/Everquest-II-Complete-Collection-Pc/dp/B002NWOP4K], Retrieved Mar. 19, 2010, 7 pages.

* cited by examiner

*Primary Examiner* — Matthew Zimmerman
(74) *Attorney, Agent, or Firm* — Vierra Magen Marcus & DeNiro LLP

(57) ABSTRACT

A processor implemented method, system and computer readable medium for performing transactions of user generated content in a centralized marketplace is provided. User generated content files usable in a game during gameplay are received from users to the centralized marketplace. A restriction on use of the user generated content files is applied. The user generated content files are presented within the centralized marketplace. A request to purchase a user generated content file in the centralized marketplace is received from a first user and a purchase transaction between the first user and a content owner of the user generated content file is completed.

10 Claims, 13 Drawing Sheets

METHOD AND SYSTEM FOR PROTECTING GAME RELATED CONTENT IN A CENTRALIZED MARKETPLACE

BACKGROUND

Multiplayer online gaming systems enable users to share a rich, interactive and common game experience in real time. An example of a multiplayer online gaming system is Microsoft's Xbox 360® video game system and Xbox Live® online game service wherein users can easily communicate with each other while playing to share the gaming experience. Another feature provided by certain online gaming services is a centralized marketplace that provides users' with the ability to create, customize and personalize game related content within a multiplayer online game environment. An example of a centralized marketplace is Microsoft's Xbox 360® Live Marketplace® (XBLM) that allows users to create, search, browse and download game related content. Game related content may include, for example, multimedia files, such as text, picture, audio, and video files that may be created and utilized to provide additional functionality within a game application.

SUMMARY

Disclosed herein is a method and system by which game related content created by users is protected. The disclosed technology ensures the controlled usage of a player's creations within a centralized marketplace while performing transactions of game related content between users within the centralized marketplace. The controlled usage of a player's creations is ensured by applying restrictions on use of the game related content within the centralized marketplace and the game. Users may browse, rate, purchase or download another user's creations within the centralized marketplace.

In an embodiment, a method for performing transactions of user generated content in a centralized marketplace is disclosed. User generated content files usable in a game during gameplay are received from users to the centralized marketplace. A restriction on use of the user generated content files within the centralized marketplace is applied. The user generated content files are presented in the centralized marketplace. In an embodiment, the user generated content files are also presented in a storefront application within the centralized marketplace. A request to purchase a user generated content file in the centralized marketplace is received from a first user and a purchase transaction between the first user and a content owner of the user generated content file is completed.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Technology is disclosed by which the controlled usage and protection of game related content created by users is ensured. A centralized marketplace in the multiplayer gaming service enables users to browse, rate or purchase another user's creations. The disclosed technology enables the controlled usage and protection of a player's creations while performing game based transactions of game related content within the centralized marketplace. Restrictions on use of the game related content within the centralized marketplace and the game during a purchase transaction between a content owner and a purchaser of the created content are defined. The disclosed technology also enables users to specify restrictions on the use of created content that they desire to make available for free to other users or make available to other users for purchase within the centralized marketplace. Game related content that has been either purchased or rated by users is scored towards a scoreboard within the centralized marketplace.

Figure 1:
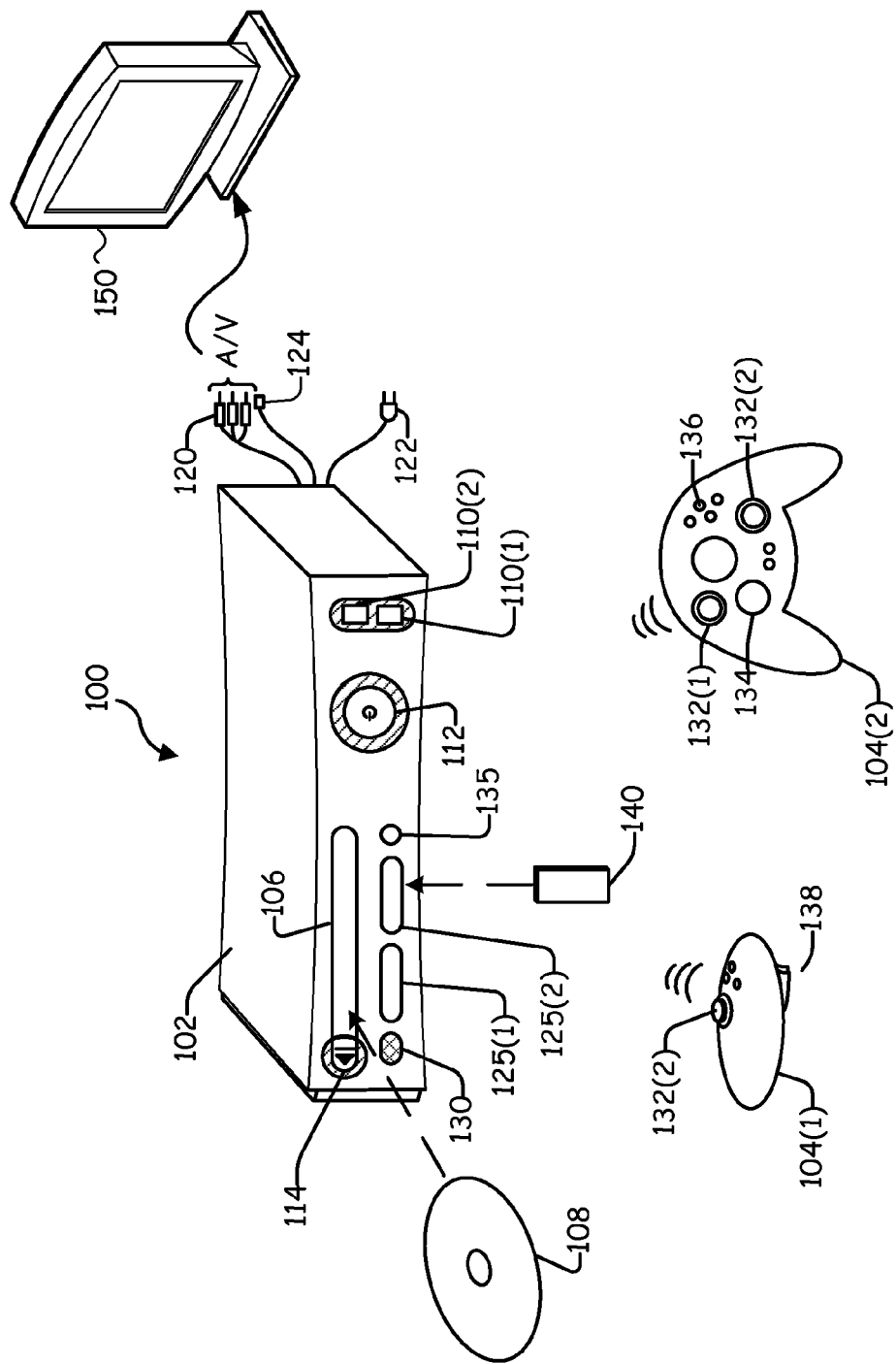
FIG. 1 is an isometric view of an exemplary gaming and media system.

FIG. 1 shows an exemplary gaming and media system 100. The following discussion of FIG. 1 is intended to provide a brief, general description of a suitable environment in which concepts presented herein may be implemented. As shown in FIG. 1, gaming and media system 100 includes a game and media console (hereinafter "console") 102. In general, console 102 is one type of computing system, as will be further described below. Console 102 is configured to accommodate one or more wireless controllers, as represented by controllers 104(1) and 104(2). Console 102 is equipped with an internal hard disk drive (not shown) and a portable media drive 106 that support various forms of portable storage media, as represented by optical storage disc 108. Examples of suitable portable storage media include DVD, CD-ROM, game discs, and so forth. Console 102 also includes two memory unit card receptacles 125(1) and 125(2), for receiving removable flash-type memory units 140. A command button 135 on console 102 enables and disables wireless peripheral support.

As depicted in FIG. 1, console 102 also includes an optical port 130 for communicating wirelessly with one or more devices and two USB (Universal Serial Bus) ports 110(1) and 110(2) to support a wired connection for additional controllers, or other peripherals. In some implementations, the number and arrangement of additional ports may be modified. A power button 112 and an eject button 114 are also positioned on the front face of game console 102. Power button 112 is selected to apply power to the game console, and can also provide access to other features and controls, and eject button 114 alternately opens and closes the tray of a portable media drive 106 to enable insertion and extraction of a storage disc 108.

Console 102 connects to a television or other display (such as monitor 150) via A/V interfacing cables 120. In one implementation, console 102 is equipped with a dedicated A/V port (not shown) configured for content-secured digital communication using A/V cables 120 (e.g., A/V cables suitable for coupling to a High Definition Multimedia Interface "HDMI" port on a high definition monitor 150 or other display device). A power cable 122 provides power to the game console. Console 102 may be further configured with broadband capabilities, as represented by a cable or modem connector 124 to facilitate access to a network, such as the Internet. The broadband capabilities can also be provided wirelessly, through a broadband network such as a wireless fidelity (Wi-Fi) network.

Each controller 104 is coupled to console 102 via a wired or wireless interface. In the illustrated implementation, the controllers 104 are USB-compatible and are coupled to console 102 via a wireless or USB port 110. Console 102 may be equipped with any of a wide variety of user interaction mechanisms. In an example illustrated in FIG. 1, each controller 104 is equipped with two thumbsticks 132(1) and 132(2), a D-pad 134, buttons 136, and two triggers 138. These controllers are merely representative, and other known gaming controllers may be substituted for, or added to, those shown in FIG. 1.

In one implementation, a memory unit (MU) 140 may also be inserted into controller 104 to provide additional and portable storage. Portable MUs enable users to store game parameters for use when playing on other consoles. In this implementation, each controller is configured to accommodate two MUs 140, although more or less than two MUs may also be employed. In another embodiment, a Universal Serial Bus (USB) flash memory storage may also be inserted into controller 104 to provide additional and portable storage.

Gaming and media system 100 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 108), from an online source, or from MU 140.

During operation, console 102 is configured to receive input from controllers 104 and display information on display 150. For example, console 102 can display a user interface on display 150 to allow a user to perform the operations of the disclosed technology as discussed below.

Figure 2A:
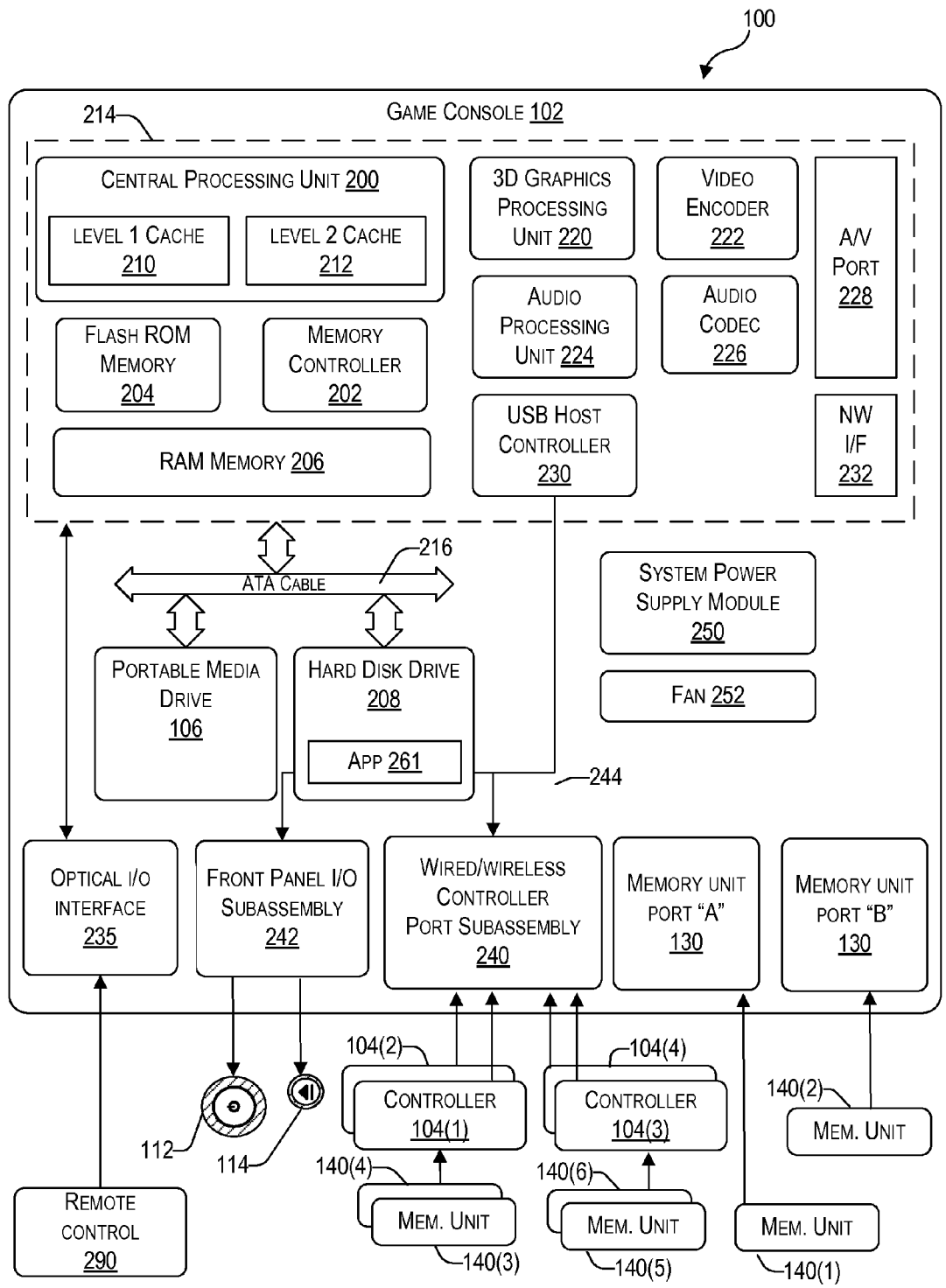
FIG. 2A is an exemplary functional block diagram of components of the gaming and media system shown in FIG. 1.

FIG. 2A is a functional block diagram of gaming and media system 100 and shows functional components of the gaming and media system 100 in more detail. Console 102 has a central processing unit (CPU) 200, and a memory controller 202 that facilitates processor access to various types of memory, including a flash Read Only Memory (ROM) 204, a Random Access Memory (RAM) 206, a hard disk drive 208, and portable media drive 106. In one implementation, CPU 200 includes a level 1 cache 210 and a level 2 cache 212, to temporarily store data and hence reduce the number of memory access cycles made to the hard drive 208, thereby improving processing speed and throughput.

CPU 200, memory controller 202, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 200, memory controller 202, ROM 204, and RAM 206 are integrated onto a common module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAM (DDR SDRAM) modules that are independently controlled by memory controller 202 via separate buses (not shown). Hard disk drive 208 and portable media drive 106 are shown connected to the memory controller 202 via the PCI bus and an AT Attachment (ATA) bus 216. However, in other implementations, dedicated data bus structures of different types can also be applied in the alternative.

A three-dimensional graphics processing unit 220 and a video encoder 222 form a video processing pipeline for high speed and high resolution (e.g., High Definition) graphics processing. Data are carried from graphics processing unit 220 to video encoder 222 via a digital video bus (not shown). An audio processing unit 224 and an audio codec (coder/decoder) 226 form a corresponding audio processing pipeline for multi-channel audio processing of various digital audio formats. Audio data are carried between audio processing unit 224 and audio codec 226 via a communication link (not shown). The video and audio processing pipelines output data to an A/V (audio/video) port 228 for transmission to a television or other display. In the illustrated implementation, video and audio processing components 220-228 are mounted on module 214.

FIG. 2A shows module 214 including a USB host controller 230 and a network interface 232. USB host controller 230 is shown in communication with CPU 200 and memory controller 202 via a bus (e.g., PCI bus) and serves as host for peripheral controllers 104(1)-104(4). Network interface 232 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 2A, console 102 includes a controller support subassembly 240 for supporting four controllers 104(1)-104(4). The controller support subassembly 240 includes any hardware and software components needed to support wired and wireless operation with an external control device, such as for example, a media and game controller. A front panel I/O subassembly 242 supports the multiple functionalities of power button 112, the eject button 114, as well as any LEDs (light emitting diodes) or other indicators exposed on the outer surface of console 102. Subassemblies 240 and 242 are in communication with module 214 via one or more cable assemblies 244. In other implementations, console 102 can include additional controller subassemblies. The illustrated implementation also shows an optical I/O interface 235 that is configured to send and receive signals that can be communicated to module 214.

MUs 140(1) and 140(2) are illustrated as being connectable to MU ports "A" 130(1) and "B" 130(2) respectively. Additional MUs (e.g., MUs 140(3)-140(6)) are illustrated as being connectable to controllers 104(1) and 104(3), i.e., two MUs for each controller. Controllers 104(2) and 104(4) can also be configured to receive MUs (not shown). Each MU 140 offers additional storage on which games, game parameters, and other data may be stored. In some implementations, the other data can include any of a digital game component, an executable gaming application, an instruction set for expanding a gaming application, and a media file. When inserted into console 102 or a controller, MU 140 can be accessed by memory controller 202. A system power supply module 250 provides power to the components of gaming system 100. A fan 252 cools the circuitry within console 102.

An application 261 comprising machine instructions is stored on hard disk drive 208. When console 102 is powered on, various portions of application 261 are loaded into RAM 206, and/or caches 210 and 212, for execution on CPU 200, wherein application 261 is one such example. Various applications can be stored on hard disk drive 208 for execution on CPU 200.

Gaming and media system 100 may be operated as a standalone system by simply connecting the system to monitor 150 (FIG. 1), a television, a video projector, or other display device. In this standalone mode, gaming and media system 100 enables one or more players to play games, or enjoy digital media, e.g., by watching movies, or listening to music. However, with the integration of broadband connectivity made available through network interface 232, gaming and media system 100 may further be operated as a participant in a larger network gaming community, as discussed in connection with FIG. 3.

Figure 2B:
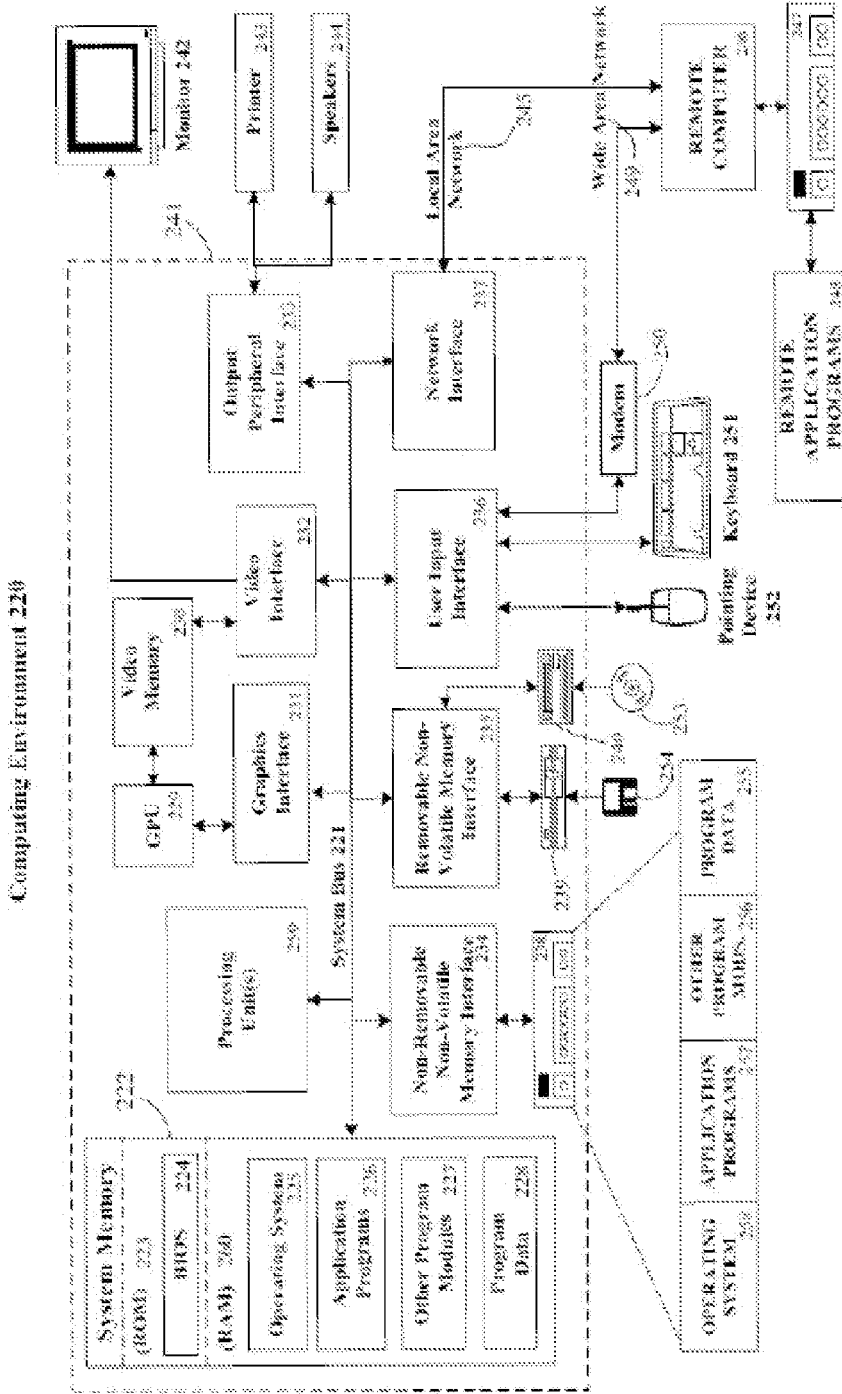
FIG. 2B illustrates another example embodiment of the gaming and media system shown in FIGS. 1-2.

FIG. 2B illustrates another example embodiment of the gaming and media system shown in FIGS. 1 and 2A. In FIG. 2B, the gaming and media system comprises a computer 241, which typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as ROM 223 and RAM 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2B illustrates operating system 225, application programs 226, other program modules 227, and program data 228.

The computer 241 may also include other removable/non-removable, volatile/nonvolatile computer storage media. By way of example only, FIG. 2B illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2B, provide storage of computer readable instructions, data structures, program modules and other data for the computer 241. In FIG. 2B, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and a pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). The cameras 26, 28 and capture device 20 may define additional input devices for the console 100. A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2B. The logical connections depicted in FIG. 2B include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2B illustrates remote application programs 248 as residing on memory device 247. It will be appreciated that the network connections shown are exemplary and other means of establishing a communications link between the computers may be used.

The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments, the various depicted computing elements may include circuitry configured to instantiate specific aspects of the present disclosure. For example, the term circuitry used in the disclosure can include specialized hardware components configured to perform function(s) by firmware or switches. In other example embodiments, the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Figure 3:
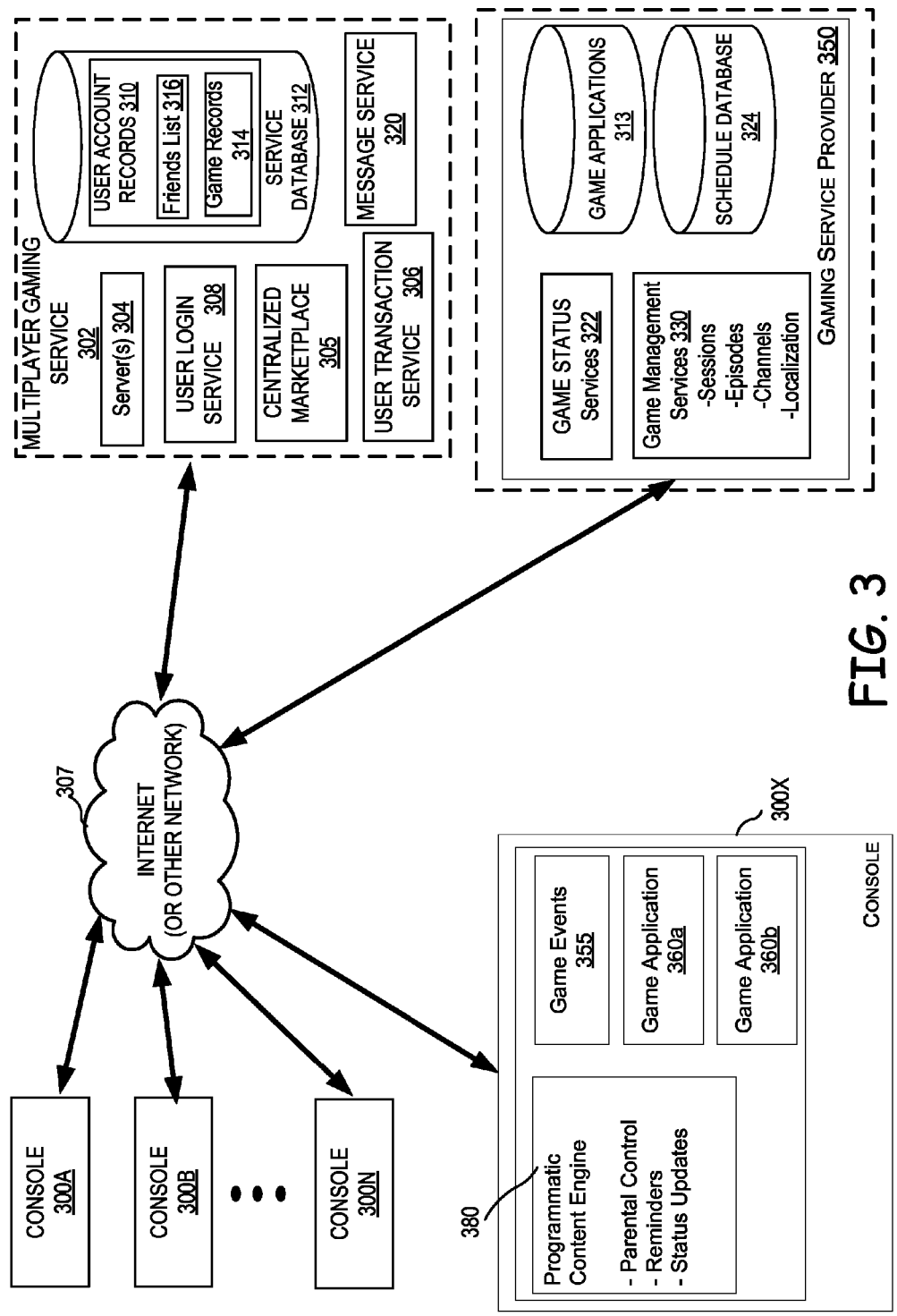
FIG. 3 is a block diagram of an exemplary operating environment for performing the operations of the disclosed technology.

FIG. 3 is a block diagram of an environment for implementing the disclosed technology. In one example, multiple consoles 300A-300X are coupled to a network 307 and can communicate with a multiplayer gaming service 302 having one or more server(s) 304 via network 307. Also present and coupled to the network is a gaming service provider 350. In one embodiment, network 307 comprises the Internet, though other networks such as LAN or WAN are contemplated. The server(s) 304 also includes a communication component capable of receiving information from and transmitting information to consoles 300A-X and provides a collection of services that applications running on consoles 300A-X may invoke and utilize. For example, the server(s) 304 in the multiplayer gaming service 302 may manage a plurality of multiplayer games concurrently by aggregating events from users executing one or more game applications on the consoles 300A-X. The server(s) 304 may also provide other gameplay services such as executing gameplay rules and outputting results to users involved in multiplayer games.

The multiplayer gaming service 302 and the gaming service provider 350 may be combined and offered by a single service provider and/or on a single server. Alternatively, the service providers may be different entities. In another embodiment, the gaming service provider 350 may be provided as a product in the form of hardware and software included on a non-volatile storage medium.

Consoles 300A-X may invoke user login service 308, which is used to authenticate a user on consoles 300A-X. During login, login service 308 obtains a gamer tag (a unique identifier associated with the user) and a password from the user as well as a console identifier that uniquely identifies the console that the user is using and a network path to the console. The gamer tag and password are authenticated by comparing them to user account records 310 in a database 312, which may be located on the same server as user login service 308 or may be distributed on a different server or a collection of different servers. Once authenticated, user login service 308 stores the console identifier and the network path in user account records 310 so that messages and information may be sent to the console.

In an embodiment, consoles 300A-X may also invoke a centralized marketplace 305 and a user transaction service 306 in the multiplayer gaming service 302. A user may also browse, rate and purchase other users' creations within the centralized marketplace 305. Specifically, users on consoles 300A-X may invoke the centralized marketplace 305 via a user interface on the consoles 300A-X. FIGS. 7-11 illustrates various user interface screens that enable a user to perform one or more operations of the disclosed technology within the centralized marketplace 305.

The user transaction service 306 receives user generated content files from users from the centralized marketplace 305 and enables the controlled usage and protection of the content files during game based transactions within the centralized marketplace 305. In an embodiment, the user transaction service 306 protects game related content created by a user by including restrictions on use of the game related content within the centralized marketplace 305 and the game. The user transaction service 306 may be implemented as a software module that includes executable instructions to perform the operations of the disclosed technology. The operations performed by the user transaction service 306 are discussed in greater detail in FIGS. 5 and 6 below.

User account records 310 include additional information about the user such as game records 314 and friends list 316. Game records 314 include information for users identified by gamer tags and can include statistics for particular games, game related content created and purchased by a user, achievements acquired for particular games and/or other game specific information.

The friends list 314 includes an indication of friends of a user that are also connected to or otherwise have user account records with the multiplayer gaming service 302. The term "friend" as used herein can broadly refer to a relationship between a user and another gamer, where the user has requested that the other gamer's consent to be added to the user's friends list and the other gamer has accepted. This may be referred to as a two-way acceptance. A two-way friend acceptance may also be created where another gamer requests the user be added to the other gamer's friends list and the user accepts. At this point, the other gamer may also be added to the user's friends list. While friends will typically result from a two-way acceptance, it is conceivable that another gamer be added to a user's friends list, and be considered a "friend," where the user has designated another gamer as a friend regardless of whether the other gamer accepts. It is also conceivable that another gamer will be added to a user's friends list, and be considered a "friend," where the other user has requested to be added to the user's friends list, or where the user has requested to be added to the other gamer's friends list, regardless of whether the user or other gamer accepts in either case.

User account records 310 may also include additional information about the user including games that have been downloaded by the user and licensing packages that have been issued for those downloaded games, including the permissions associated with each licensing package. Portions of user account records 310 can be stored on an individual console, in database 312 or on both. If an individual console retains game records 314 and/or friends list 316, this information can be provided to multiplayer gaming service 302 through network 307. Additionally, the individual console has the ability to display information associated with game records 314 and/or friends list 316 without having a connection to the multiplayer gaming service 302.

The server(s) 304 in the multiplayer gaming service 302 also includes a message service 320 which permits one console, such as console 300A, to send a message to another console, such as console 300B. The message service 320 is known, the ability to compose and send messages from a console of a user is known, and the ability to receive and open messages at a console of a recipient is known. Mail messages can include emails, text messages, voice messages, attachments and specialized in-text messages known as invites, in which a user playing the game on one console invites a user on another console to play in the same game while using network 307 to pass gaming data between the two consoles so that the two users are playing from the same session of the game. Friends list 316 can also be used in conjunction with message service 320.

In accordance with the technology, the gaming service provider 350 allows a multitude of users on consoles 300A-300X to participate in a group game environment. The group may be as small as two users and may include hundreds of thousands of users. The gaming service provider 350 obtains game data and state information from the multiplayer gaming service 302, which it uses to provide information to console users. It will be understood that the gaming service provider 350 and the multiplayer gaming service 302 may be integrated into a single service and/or a single server. Alternatively, the gaming service provider 350 may be managed by the same administrator of the multiplayer gaming service 302 or different administrators.

Also shown in FIG. 3 with respect to the gaming service provider 350 are game status services 322 and game management services 330. The game status services 322 collect user game statistics associated with a game. Game management services 330 provide the gaming environment while control over gameplay is handled by the multiplayer gaming service 302. In addition, the game management services 330 may provide organization of the program game content, breaking down the games into different sections, episodes, organizing the games into different channels, and ensuring that localized content is directed to the proper console and user.

Also included in the gaming service provider 350 are a scheduling database 324 and a library of game applications 313. The library of game applications 313 may comprise instructions executed on each of the consoles to allow one or more users interacting with the console to participate in a multiplayer game. The schedule database 324 can be used to provide game status services to the users on consoles 300A-X.

Console 300X illustrates functional components which may be present on each of the consoles 300A-300X. Each console 300A-300X may be of a type such as that illustrated in FIGS. 1 and 2, wherein the functional components may comprise one or more sets of instructions or applications instructing the processor 200 to perform the functions described herein. Such functional components may be implemented in hardware, software or a combination of hardware or software. Moreover, the instructions may be embodied in a computer readable medium. A computer readable medium may include volatile and nonvolatile, removable and non-removable media implemented in any method or technology for storage of information such as computer readable instructions, data structures, program modules or other data. Computer readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by consoles 300A-300X.

Console 300X (as well as consoles 300A-300N) may include one or more game applications 360a, 360b. The game applications may be delivered via a download from the game applications data store 313, may be present in non-volatile memory such as Flash ROM memory 204 in the console, or may be provided on a computer storage medium such as a CD ROM, or other disk. The console 300x also includes a programmatic content engine 380 that may include parental control functionality, game reminder functionality, and friend or game status updates. The programmatic content engine 380 may also provide a set of foundational components such as libraries, methods, tools and data which are re-usable by programmatic content games running on the console. When games are executed on the console, new game events 355 occur when a user provides input to the game, or as a result of another user's input to the game being returned to the console. Events caused by user activity on the console 300X are transmitted to the multiplayer gaming service 302 which manages the game playing function.

Figure 4:
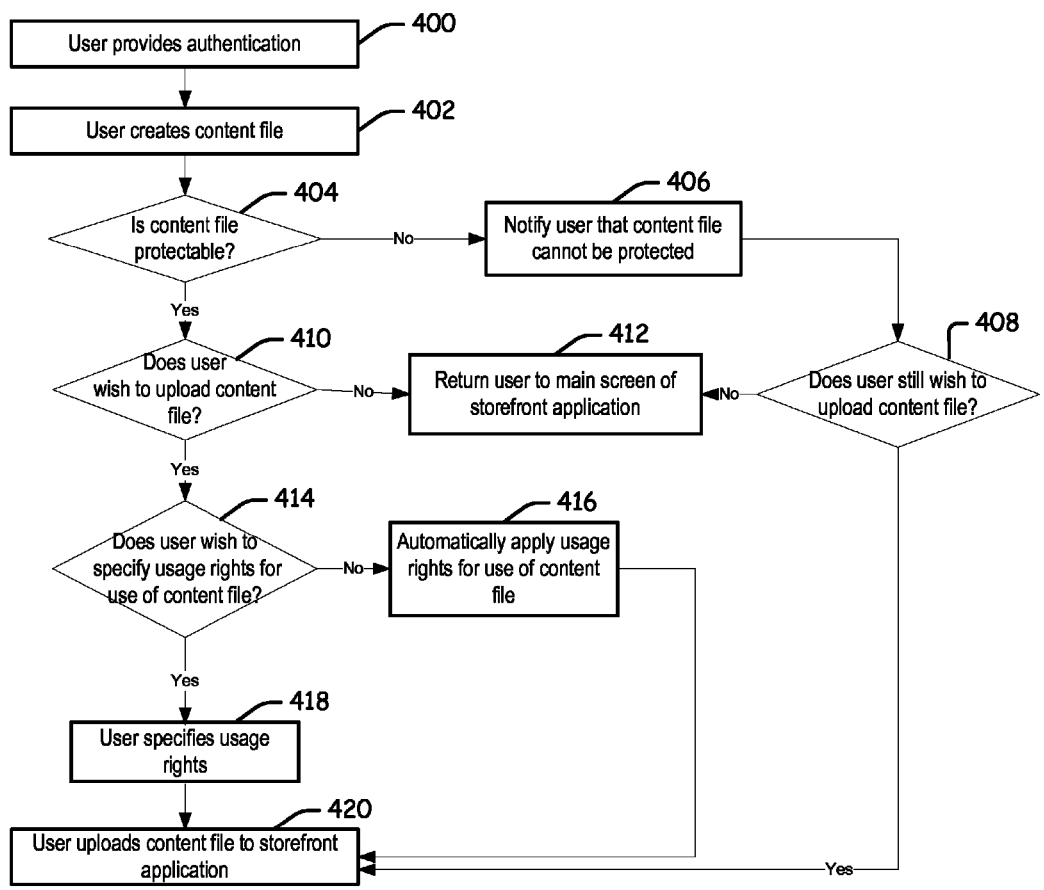
FIG. 4 illustrates an exemplary set of operations performed by a user to protect game related content created by the user within a centralized marketplace.

FIG. 4 illustrates an exemplary set of operations performed by a user to protect game related content created by the user within a centralized marketplace. In one embodiment, the steps of FIG. 4 may be performed on a user console. In step 400, a user provides authentication on a gaming console, such as, for example, console, 300X shown in FIG. 3. Authentication may be performed locally on the console or by transmitting user authentication credentials to the multiplayer gaming service 302. Once authenticated, the user may be connected to the centralized marketplace 305 in the multiplayer gaming service 302. FIGS. 7-11 illustrate exemplary user interface screens of a centralized marketplace 305 and a storefront application within the centralized marketplace 305.

In an embodiment, a user may wish to upload a content file to the user's storefront application within the centralized marketplace 305. In step 402, the user creates a content file. As used herein, a content file refers to game related content created by a user such as multimedia files, text files, picture files, audio files, and video files. The user generated content files may be created for any game which provides the user a tool for generating such files, or allows use of files within the game which are created by development tools available to the user. In an embodiment, one such game providing such tools for user generated content files is the Forza Motorsport™ racing simulator video game application developed for Microsoft's Xbox 360® video game system. In alternative embodiments, the content may be provided for any console or on-line based game which allows for user generated content to be created and shared amongst different users. User generated content files related to, for example, the Forza Motorsport™ racing simulator video game application may include car design files, tuning set up files, paint files, vinyl groups, photos and replays, in an embodiment.

As will be appreciated, the Forza Motorsport™ racing simulator video game application provides users with the ability to customize and personalize their cars during gameplay. Tuning setup files, paint files and vinyl groups provide users with additional car customization and personalization options. For example, users may specify tuning parameters such as suspension setup parameters, tire pressure parameters, brake force parameters, differentials and aerodynamics via tuning setup files. Custom color specifications for a car design may be specified via paint files. Custom fonts, corporate logos, game logos, license plates and bumper stickers may be specified via vinyl groups or car decals. In addition, photos and replays enable users to share the details of a particular car race with other users within the centralized marketplace 305. The above examples of user generated content files relate to specific examples of game related content developed by users for the Forza Motorsport™ racing simulator video game application. However, it is to be appreciated that embodiments of the disclosed technology may be applied to any console or on-line based game which allows for user generated content to be created and shared amongst different users.

Figure 5:
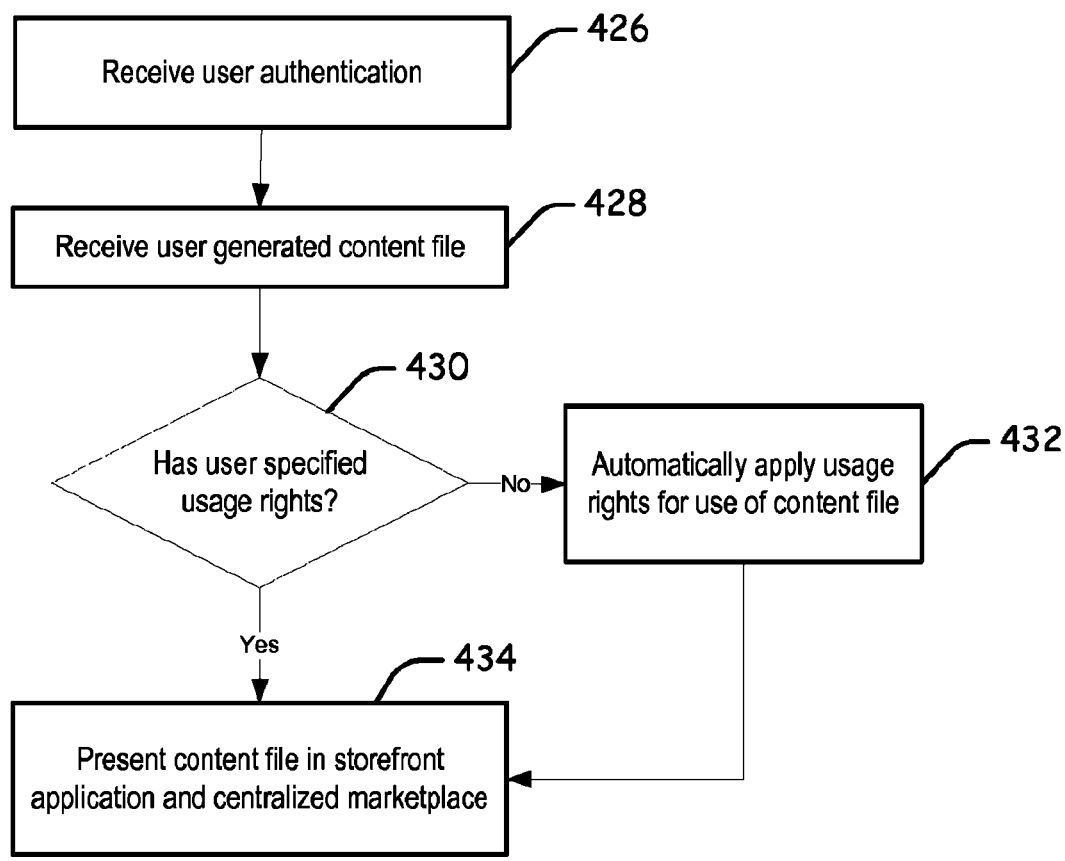
FIG. 5 illustrates an exemplary set of operations performed by the disclosed technology to protect game related content created by users within a centralized marketplace.

The disclosed technology enables the controlled usage of game related content created by a user by applying restrictions on use of the user generated content files within the centralized marketplace 305. FIG. 4 describes a process by which a user may specify usage rights for use of the content files. Alternatively, usage rights for use of the content files may be automatically applied. In an embodiment, the user transaction service 306 in the multiplayer gaming service 302 may automatically apply usage rights for use of the content files. FIG. 5 describes a process by which usage rights for use of content files may be automatically applied. In addition, it is to be appreciated that certain content files published in the centralized marketplace 305 may not have the ability for usage rights to be specified on them, either by a user or by the multiplayer gaming service 302, and are referred to herein as non-protectable content files.

After a content file is created by the user in step 402, in step 404, a check is made to determine if the content file is protectable. As used herein, a protectable content file refers to a content file for which usage rights may be specified, either by the user or automatically by the user transaction service 306. If the content file is a non-protectable content file, that is, if usage rights for use of the content file may not be specified either by the user or by the user transaction service 306, then the user is notified that the content file cannot be protected in step 406. It step 408, a check is made to determine if the user wishes to upload the content file to the user's storefront application. If the user wishes to upload the content file, the content file is uploaded to the user's storefront application in step 424. If the user does not wish to upload the content file to his storefront application given that the file cannot be protected, the user is returned to the main screen of the storefront application in step 412.

Figure 10:
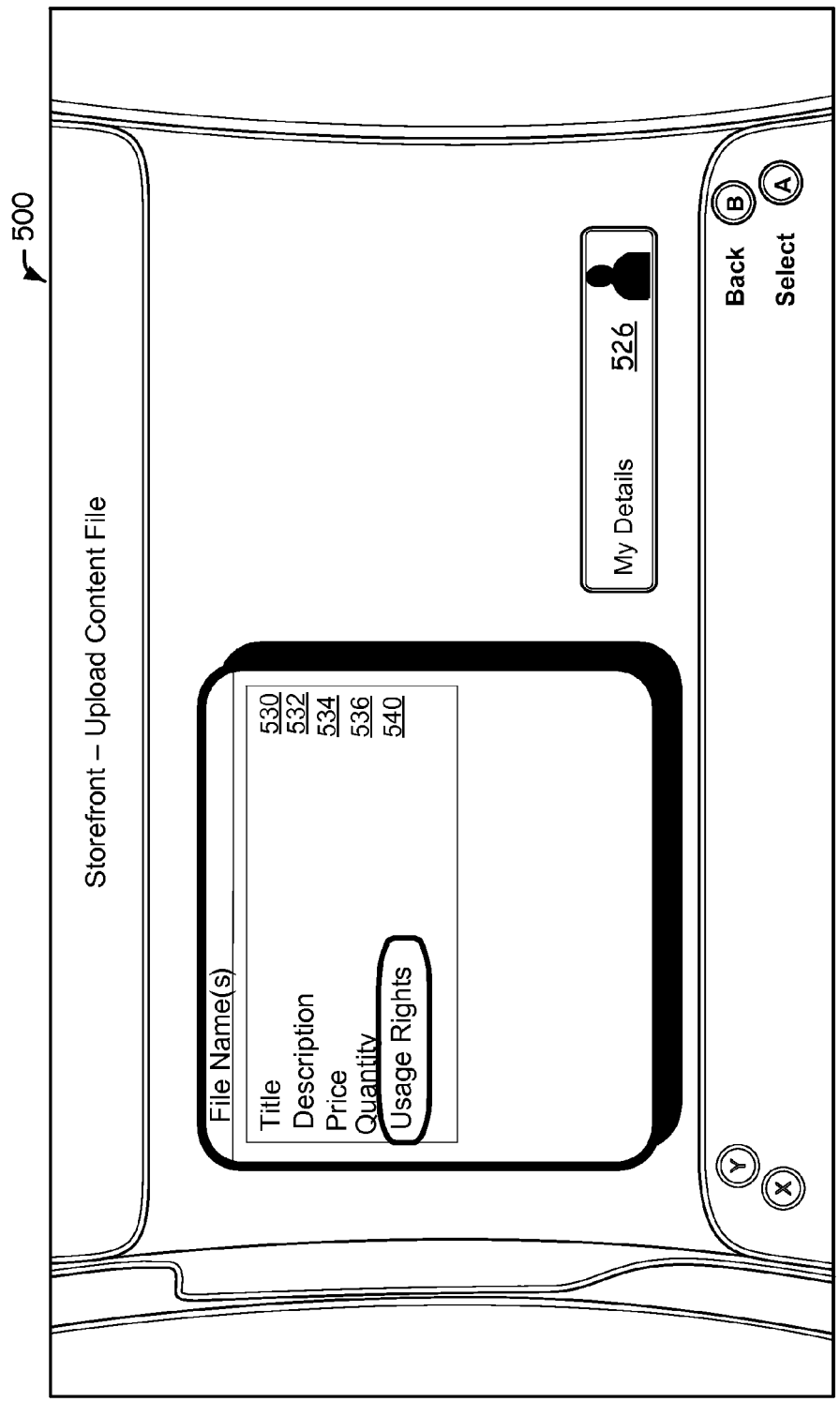
Figure 11:
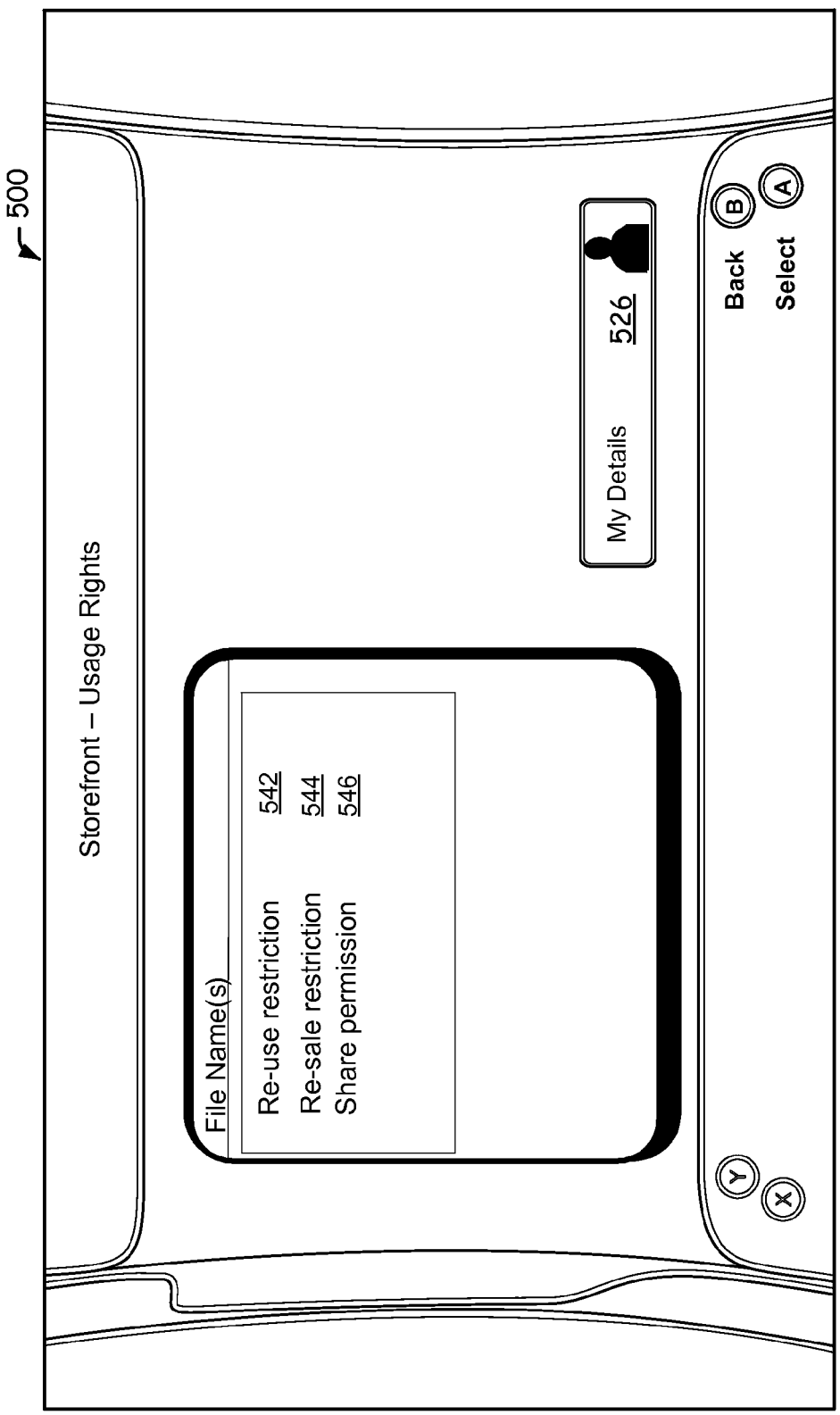

In step 414, a check is made to determine if the user desires to specify usage rights for use of the user generated content file. If the user desires to specify usage rights, then at step 418, the user may be prompted to specify the usage rights. FIGS. 10 and 11 illustrate exemplary user interface screens that enable a user to specify usage rights for use of a content file. In one embodiment, a user may specify a re-sale restriction on use of the content file. A re-sale restriction prevents purchasers or users other than the creator from re-selling a purchased content file to other users in the centralized marketplace 305. In alternate embodiments, a user may also specify a re-use restriction or a modify restriction on use of a content file. A re-use restriction prevents users from selling a purchased content file that can be re-used in the context of another content file to another user. A modify restriction prevents users from modifying a content file that has been either purchased or made available for sharing in the centralized marketplace. The user may also specify share permission on use of the content file with other users in the centralized marketplace 305. Alternatively, a user may also specify a share restriction on use of the content file. A share restriction prevents users from sharing a purchased content file with other users in the centralized marketplace 305. It is to be appreciated that a user may specify any combination of the above mentioned restrictions on use of content files to perform the operations of the disclosed technology.

If the user does not desire to specify usage rights for use of the user generated content file, usage rights for use of the content file may be automatically applied in step 416. The process of automatically applying usage rights for use of the content file is discussed in FIG. 5. In one embodiment, the process of automatically applying usage rights for use of the content file is performed by executable instructions in the user transaction service 306 in the multiplayer gaming service 302. In alternative embodiments, the process of automatically applying usage rights for use of the content file may also be performed by alternative processors such as processor 200 in console 102 as illustrated in FIG. 2A or by processing unit 259 in computer 241 as illustrated in FIG. 2B. In step 420, the user uploads the content file to the user's storefront application in the centralized marketplace 305.

FIG. 5 illustrates an exemplary set of operations performed by the disclosed technology to protect game related content created by users within a centralized marketplace. In an embodiment, the steps of FIG. 5 may be performed by the user transaction service 306 in the multiplayer gaming service 302. In step 426, a user's authentication is received via the user login service 308 in the multiplayer gaming service 302. In order for a user to connect to the centralized marketplace 305, the user identity must be verified. As noted above, this may be performed at the console or at the service level. In step 428, one or more user generated content files uploaded by the user (as discussed in step 424 of FIG. 4) are received. In step 430, a check is made to determine if the user has specified usage rights for use of the content file. As discussed above, steps (418-422) in FIG. 4 describe the process by which a user may specify usage rights for use of the content file. If the user has specified usage rights, then the content file is presented in the user's storefront application and the centralized marketplace 305 in step 434. If the user has not specified usage rights, then usage rights on use of the user generated content file may be automatically applied in step 432. In an embodiment, the user transaction service 306 automatically applies usage rights on use of at least certain types of content files by identifying the content file as a lockable item or a non-lockable item within the centralized marketplace 305. As used herein, a lockable item refers to a content file for which at least one of a re-use restriction and a re-sale restriction may be automatically applied and a non-lockable item refers to a content file which may automatically be made available for sharing to all users, within the centralized marketplace 305. A lockable item, in the context of the Forza Motorsport™ racing simulator video game application may include, for example, car design files, tuning setup files, paint files or vinyl groups, in an embodiment. A non-lockable item, in the context of the Forza Motorsport™ racing simulator video game application may include, for example, may include photos and replays created by the user, in an embodiment. In step 434, the user generated content file is presented in the user's storefront application and the centralized marketplace 305.

Figure 6A:
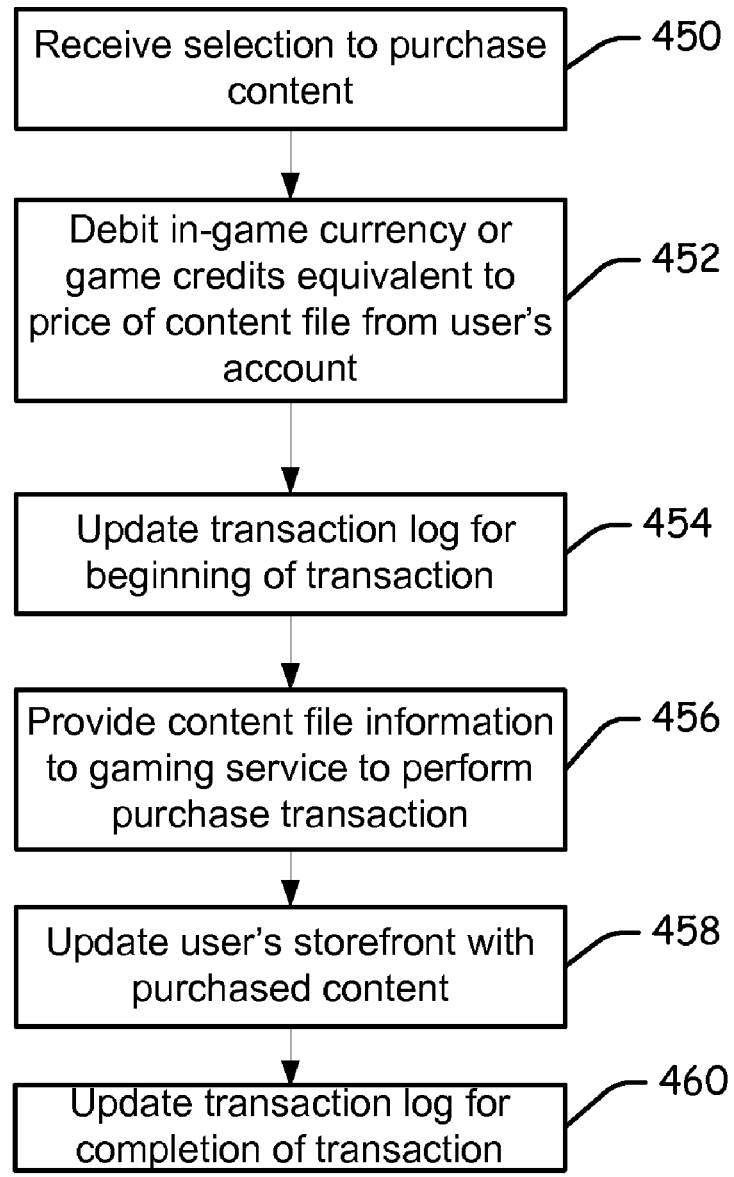
FIGS. 6A and 6B illustrate an exemplary set of operations performed by the disclosed technology to perform a purchase transaction between a first user and a content owner of a content file within a centralized marketplace.
Figure 6B:
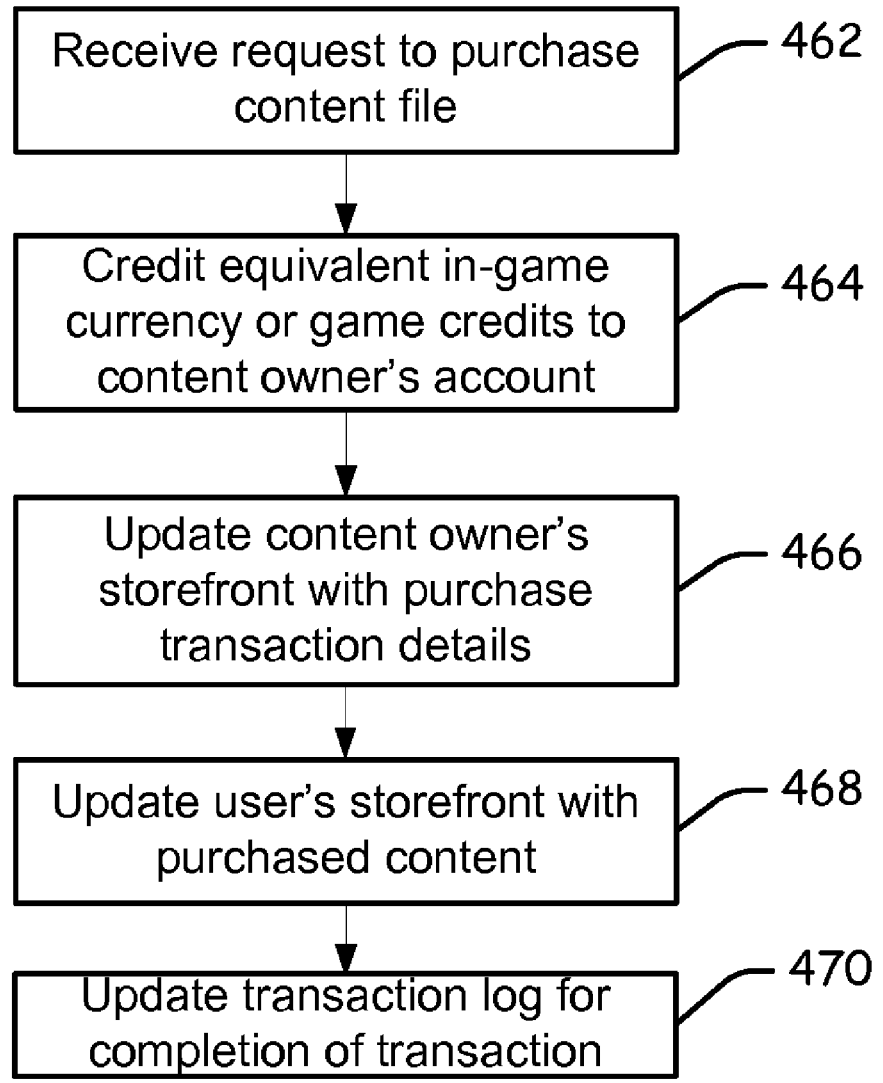

FIGS. 6A and 6B illustrate a set of operations performed by the disclosed technology to perform a purchase transaction between a first user and a content owner of a content file in a centralized marketplace. As discussed above, users connected to the centralized marketplace 305 may view, rate, download, share or purchase content files published in the centralized marketplace 305. In an embodiment, a user may select to purchase a content file in the centralized marketplace 305. FIG. 6A illustrates a set of operations that may be performed by a processor in the user's console such as processor 200 in console 102 as illustrated in FIG. 2A or by processing unit 259 in computer 241 as illustrated in FIG. 2B to initiate a purchase transaction between a first user and a content owner of a content file. A user requests to purchase a content file by selecting a content file in the centralized marketplace in step 450. In step 452, in-game currency or game credits equivalent to the price of the content file is debited from the user's account. In step 454, a transaction log is updated to indicate the commencement of a purchase transaction between the user and the content owner. This step may include analyzing a purchase history of past purchases associated with the content file in the transaction log to verify that a valid purchase transaction of the content file can commence. For example, a purchase transaction of a content file may not be valid if a user wishes to re-sell a purchased content file to another user, when the content file has a re-sale restriction applied on it. In step 456, the content file information is provided to the multiplayer gaming service 302 to perform a purchase transaction between the user and the content owner. The operations performed by the multiplayer gaming service 302 are discussed in FIG. 6B. In step 458, the user's storefront is updated with the purchased content, once for example, the content owner's storefront application is updated with details of the purchase transaction by the multiplayer gaming service 302. In step 460, the transaction log is updated for completion of the purchase transaction.

FIG. 6B illustrates a set of operations that may be performed by the multiplayer gaming service 302 to perform a purchase transaction between a first user and a content owner of the content file. In step 462, a user's request to purchase a content file in the centralized marketplace is received. In step 464, in-game currency or game credits equivalent to the price of the content file is credited to the content owner's account. The content owner's storefront application is updated with details of the purchase transaction in step 466. The user's storefront application is updated with the purchased content in step 468. In step 470, the transaction log is updated for completion of the purchase transaction. It is to be appreciated that the operations of updating the user's storefront application with the purchased content (step 468) and updating the transaction log for completion of the purchase transaction (step 470) may also be performed by a processor in the user's console as discussed in FIG. 6A above. In an embodiment, a two phase transaction commit protocol is utilized by the disclosed technology to execute the purchase transaction. As will be appreciated, a two phase transaction commit protocol is a type of consensus or atomic commitment protocol that enables the integration and updation of data on multiple processes or multiple platforms with integrity by guaranteeing that every single transaction in the system is executed to completion. The steps illustrated in FIGS. 6A and 6B may be iteratively performed for each purchase transaction.

As mentioned above, content files published in the centralized marketplace 305 may be available for users to view, rate, download, share or purchase. FIGS. 6A and 6B illustrate exemplary steps performed by the disclosed technology to execute a purchase transaction between users in a centralized marketplace 305. In another embodiment, a user may also desire to share a content file with other user in the centralized marketplace 305. Similar operations such as discussed with respect to FIGS. 6A and 6B may be performed to execute a sharing transaction between users in the centralized marketplace 305.

Figure 7:
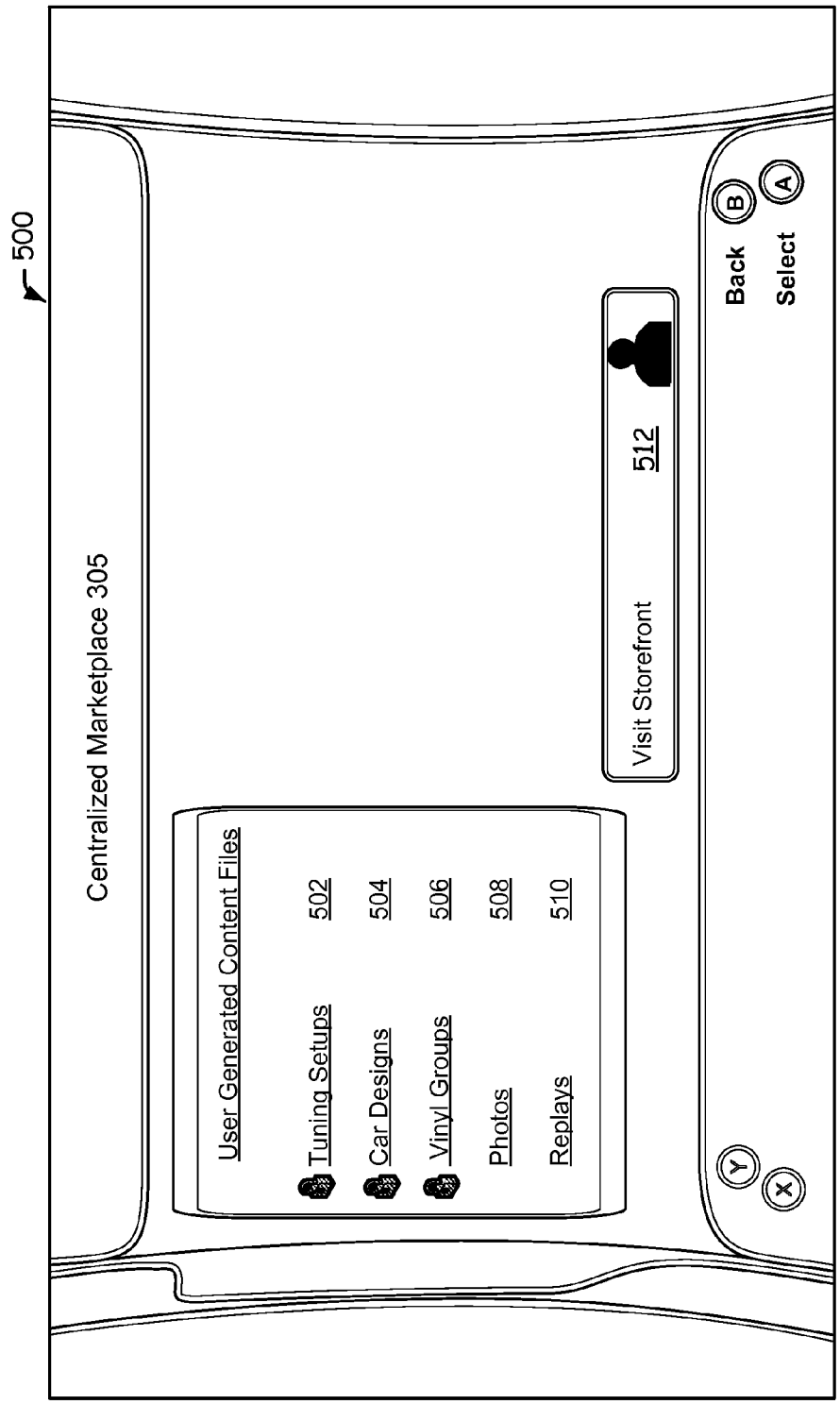
FIGS. 7-11 illustrate various user interface screens that enable a user to perform one or more operations of the disclosed technology.
Figure 8:
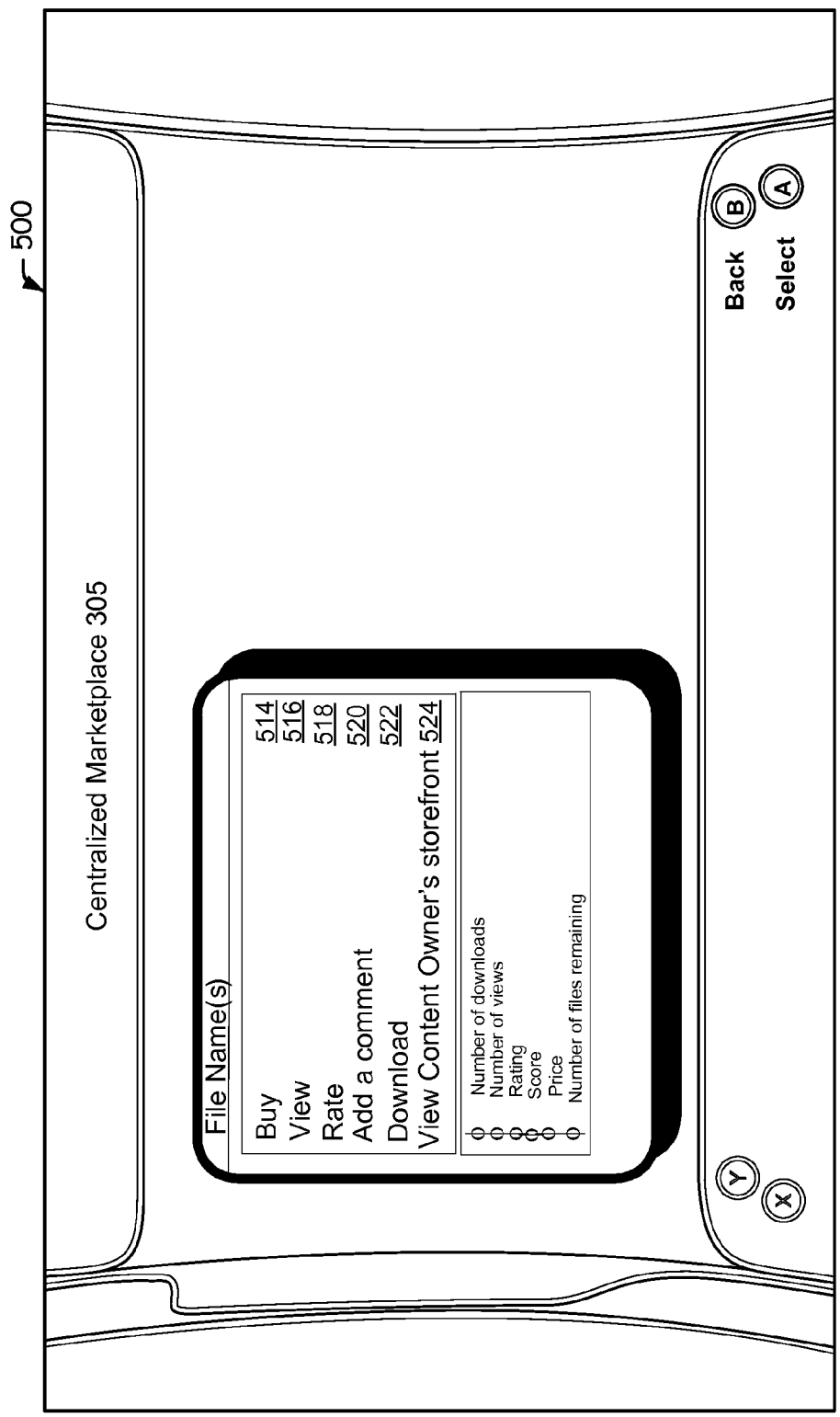
Figure 9:
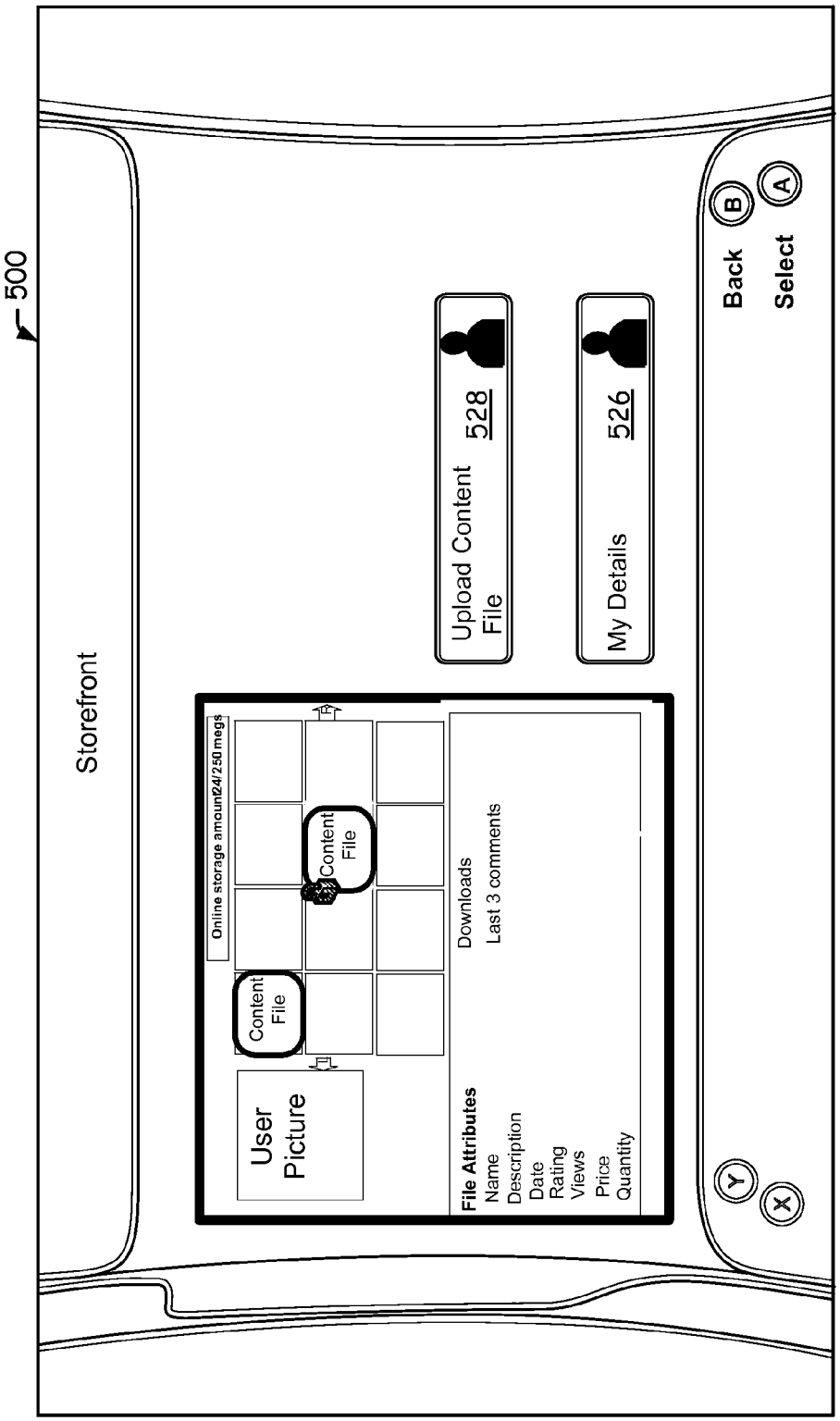

FIGS. 7-11 illustrate user interface screens that enable a user to perform one or more operations of the disclosed technology. A user provides authentication on a gaming console, such as, for example, console, 300X shown in FIG. 3 and is connected to the centralized marketplace 305 in the multiplayer gaming service 302. In order for a user to connect to the centralized marketplace 305, the user identity must be verified. As noted above, this may be performed at the console or at the service level. FIG. 7 illustrates an exemplary user interface screen that displays a centralized marketplace to a user. A user may select to view one or more content files within the centralized marketplace 305. As illustrated, the exemplary content files displayed in the centralized marketplace 305 are represented as user selectable elements, 502-510, in the user interface screen 500. A user may select any one of the content files by highlighting any one of the visual elements 502-510 responsive to positioning instructions received from the controller 104. As further illustrated, the content files selectable by a user in the centralized marketplace 305 may include locked items such as tuning setups 502, car designs 504, and vinyl groups 506 and un-locked items, such as photos 508 and replays 510 related to the game, in an embodiment. Upon selection of a particular content file by the user, a user interface screen as illustrated in FIG. 8 is displayed to the user. A user may also select to view his storefront application by selecting the "Visit Storefront" option 512 in the centralized marketplace 305. Upon selecting the "Visit Storefront" option 512, a user interface screen as illustrated in FIG. 9 is displayed to the user.

FIG. 8 illustrates an exemplary user interface screen provided to a user when the user selects a content file within the centralized marketplace 305 in the multiplayer gaming service 302. As illustrated, the user may be provided with multiple options represented as user selectable elements 514-524 in the user interface 500 upon selecting a content file in the centralized marketplace 305. In an embodiment, the options provided to the user may include a "Buy" option 514, a "View" option 516, a "Rate" option 518, an "Add comment" option 520, a "Download" option 522 and a "View Content Owner's Storefront" option 524. The "Buy" option 514 enables a user to purchase a selected content file in the centralized marketplace 305, if the content file is made available for purchase to users within the centralized marketplace 305. In an embodiment, upon activation of the "Buy" option 514, the user transaction service 306 performs a purchase transaction between the user and the content owner as discussed in FIG. 5 and the purchased file is displayed in the user's storefront application upon successful completion of the purchase transaction. A user may select the "View" option 516 to view the contents of a selected content file. A user may select the "Rate" option 518 to rate a selected content file. In an embodiment, the disclosed technology may also include operations to generate a score for a content file based on the rating provided to the content file. In addition, the score generated for a content file may also be based upon the download frequency, the purchase history and the viewing frequency associated with the content file. The scores generated for each content file may be displayed via a scoreboard within the centralized marketplace 305. A user may select the "Add comment" option 520 to comment on a selected content file. A user may select the "Download" option 522 to download a selected file to his storefront application, if usage rights on use of the content file permit the user to download the content file.

A user may also select to view the content owner's storefront by selecting the "View Content Owner's Storefront" option 524. A user may be presented with a user interface screen similar to the user interface screen shown in FIG. 9 displaying the content owner's storefront to the user. A user may also select any content file displayed in the content owner's storefront and may be presented with options (514-524) discussed above. For example, a user may wish to purchase a content file from the content owner's storefront by selecting a file from the content owner's storefront. A user may purchase a content file from the content owner's storefront but is prevented from re-selling the content file to another user, if the content file has a re-sale restriction specified on it, in accordance with the operations performed by the disclosed technology. In another embodiment, a user may also tag the content owner as a favorite and the user's storefront is updated to display the content owner as a favorite in the user's favorite list. As further illustrated in the screen display shown in FIG. 8, the attributes associated with each content file may also be displayed in the centralized marketplace 305. In an embodiment, a content file may include attributes such as the number of times the content file has been downloaded (Number of downloads), the number of times the content file has been viewed, (Number of views), the rating given to the content file (Rating), the score generated for the content file (score) the price associated with the content file (Price) and the quantity (Number of files remaining) of content files remaining.

FIG. 9 is a user interface screen displaying a storefront application associated with a user within the centralized marketplace. A user may select to view his storefront application in the centralized marketplace 305 by selecting option 512 as shown in FIG. 7. As illustrated, the user's storefront may include a picture of the user and the content files created or purchased by a user. The user's storefront may also display a plurality of file attributes associated with each content file such as the name of the content file, a description of the content file, the date of creation of the content file, a rating associated with the content file, the number of views associated with the content file, the selling price of the content file, the quantity of the content files remaining, the number of downloads for the content file and the comments associated with the content file. A user may wish to upload a content file to his storefront application by activating the "Upload Content File" option 528. Upon activating the "Upload Content File" option 528, the user may be presented with a user interface screen shown in FIG. 10. A user may also view his details by selecting the "My Details" option 526. Upon activation of the "My Details" option, the user's friends, favorites, auctions and leaderboard rank may be displayed to the user.

FIG. 10 illustrates an exemplary user interface screen that enables a user to specify usage rights for use of a content file. Once the user activates the "Upload Content File" option 528 as illustrated in FIG. 9, the user may be provided with a user interface screen as illustrated in FIG. 10. The user may be provided with an option (represented by user selectable element 540) to specify usage rights for use of the content file. Upon activating the "Usage Rights" option 540, the user is presented with a user interface screen as illustrated in FIG. 11. The user may also specify a title, description, price and quantity associated with the content file by selecting options, "Title" 530, "Description" 532, "Price" 534 and "Quantity" 536, as illustrated in FIG. 10.

FIG. 11 illustrates an exemplary user interface screen that enables a user to specify usage rights for use of a content file. Upon activation of the "Usage Rights" option 540 shown in FIG. 10, the user may be provided with a user interface screen as illustrated in FIG. 11. As illustrated, the user may specify a "re-use restriction" by selecting option 542, a "re-sale" restriction by selecting option 544 or specify "share permission" by selecting option 546.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A computer implemented method for performing a plurality of transactions of user generated content in a centralized marketplace, the method comprising:
   storing a first set of categories of content files associated with lockable content items;
   storing a second set of categories of content files associated with non-lockable content items;
   receiving user generated content files usable in a game during gameplay, each user generated content file having an associated category and having no user specified usage rights;
   identifying one or more of the received user generated content files as lockable within the centralized marketplace and the game by one or more processors implementing the centralized marketplace comparing the associated categories of at least one of the received user generated content files with the stored first set of categories of content files associated with lockable content items:
   the one or more processors implementing the centralized marketplace applying at least one or more of a re-sale restriction, a re-use restriction and a modify restriction to the one or more of the received user generated content files identified as lockable within the centralized marketplace and the game;
   identifying one or more of the received user generated content files as non-lockable items within the centralized marketplace and the game by the one or more processors implementing the centralized marketplace comparing the associated categories of at least one of the received user generated content files with the stored second set of categories of content files associated with non-lockable content items;
   the one or more processors implementing the centralized marketplace refraining from applying the re-sale restriction, re-use restriction, and modify restriction to the one or more of the received user generated content files identified as non-lockable and instead sharing the one or more of the received user generated content files identified as non-lockable to users of the centralized marketplace and the game;
   displaying the one or more of the received user generated content files identified as lockable and the one or more of the received user generated content files identified as non-lockable in the centralized marketplace; and
   performing one or more transactions between at least one user and at least one content owner of the one or more of the received user generated content files identified as lockable and the one or more of the received user generated content files identified as non-lockable within the centralized marketplace and the game.

2. The computer implemented method of claim 1 wherein the
   the first set of categories of content files associated with lockable content items include at least one of design files, paint files, and tuning setup files; and
   the second set of categories of content files associated with non-lockable content items include at least photo files and replay files.

3. The computer implemented method of claim 1 wherein a lockable content item allows a purchaser to change game related content for subsequent gameplay and a non-lockable content item permits a purchaser to view game related content from previous gameplay.

4. The computer implemented method of claim 1 wherein the received user generated content files further comprise a user generated content file having user specified usage rights indicating a restriction on use; and the one or more processors implementing the centralized marketplace applying the restriction on use to the user generated content file having user specified usage rights.

5. The computer implemented method of claim 1 further comprising presenting the one or more of the received user generated content files identified as lockable and the one or more of the received user generated content files identified as non-lockable in a storefront application associated with a user within the centralized marketplace.

6. A gaming system comprising:
one or more processors configured to:
  store a first set of categories of content files associated with lockable content items;
  store a second set of categories of content files associated with non-lockable content items;
  receive user generated content files usable in a game during gameplay, each user generated content file having an associated category and having no user specified usage rights;
  identify one or more of the received user generated content files as lockable within the centralized marketplace and the game by the one or more processors implementing the centralized marketplace comparing the associated categories of at least one of the received user generated content files with the stored first set of categories of content files associated with lockable content items;
  the one or more processors implementing the centralized marketplace applying at least one or more of a re-sale restriction, a re-use restriction and a modify restriction to the one or more of the received user generated content files identified as lockable within the centralized marketplace and the game;
  identifying one or more of the received user generated content files as non-lockable within the centralized marketplace and the game by the one or more processors implementing the centralized marketplace comparing the associated categories of at least one of the received user generated content files with the stored second set of categories of content files associated with non-lockable content items;
  the one or more processors implementing the centralized marketplace refraining from applying the re-sale restriction, re-use restriction, and modify restriction to the one or more of the received user generated content files identified as non-lockable and instead sharing the one or more user generated content files identified as non-lockable to users of the centralized marketplace and the game;
  displaying the one or more of the received user generated content files identified as lockable and the one or more of the received user generated content files identified as non-lockable in the centralized marketplace; and
  performing one or more transactions between at least one user and at least one content owner of the one or more of the received user generated content files identified as lockable and the one or more of the received user generated content files identified as non-lockable within the centralized marketplace and the game.

7. The computer implemented method of claim 1 further comprising receiving a rating of at least one of the user generated content files from a user.

8. The computer implemented method of claim 7 further comprising generating a score for the at least one of the user generated content files based on at least one of the rating, a download frequency, a purchase history and a view frequency associated with the at least one of the user generated content files.

9. The computer implemented method of claim 8 comprising displaying the score associated with the at least one of the user generated content files in the centralized marketplace.

10. The computer implemented method of claim 1 further comprising receiving a request to tag a content owner of at least one of the user generated content files as a favorite from a user.

* * * * *